(No Model.)
L. R. FIX.
Grain Conveyer Belt.
No. 241,340. Patented May 10, 1881.
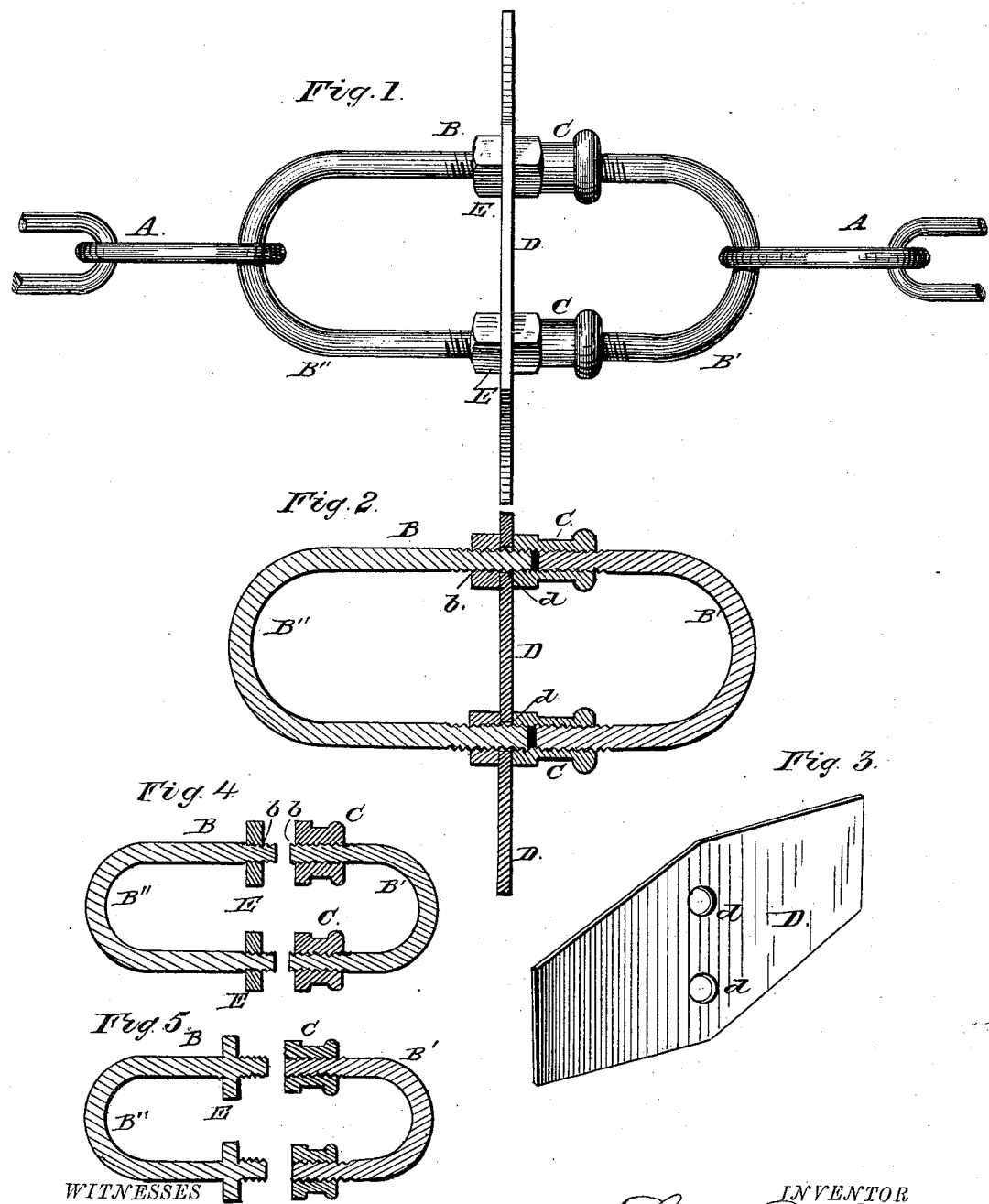

United States Patent Office.

LEWIS R. FIX, OF BURLINGTON, IOWA, ASSIGNOR OF ONE-HALF TO HENRY HARRISON, OF SAME PLACE.

GRAIN-CONVEYER BELTS.

SPECIFICATION forming part of Letters Patent No. 241,340, dated May 10, 1881.

Application filed April 8, 1881. (No model.)

*To all whom it may concern:*

Be it known that I, LEWIS R. FIX, a citizen of the United States, residing at Burlington, in the county of Des Moines and State of Iowa, have invented certain new and useful Improvements in Grain-Conveyer Belts; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in detachable links for chain-belts, and to means of securing thereto push-plates for grain-conveyers; and it consists in constructions and combinations hereinafter described, and set forth in the claims hereto annexed.

In the accompanying drawings, which illustrate my invention, Figure 1 is a side elevation of a chain embodying my invention. Fig. 2 is a sectional elevation. Fig. 3 is a perspective of the detachable link and push-plate. Fig. 4 is a sectional elevation, showing the detachable link separated. Fig. 5 is a modification, same sectional elevation as Fig. 4.

Referring to the drawings by letters, the same letter indicating the same part in the different figures, letters A represent links of an ordinary chain, and letters B a detachable link, or link which may be connected and disconnected with the chain. The link B is formed in two parts, B' B", the ends $b$ of each part being screw-threaded, as shown in the drawings.

C C are elongated nuts, which, being first turned or screwed back onto the threaded ends of the part B' or B", (on the part B', as shown at Fig. 4,) the ends of the parts B' B" may then be brought together and the nuts C be screwed forward so as to embrace the ends of both parts B' and B", as shown at Fig. 2, and thereby hold them securely together. By turning the nuts C back again to the positions shown at Fig. 4 the parts B' and B" may be separated. It is not deemed necessary to describe here the ordinary uses of the detachable link.

D is a push-plate, or plate attached to a belt and adapted to force or push grain through a conveyer-trough.

My improved link B may be used to attach the push-plate D to a chain-belt, as follows: Nuts E E are screwed onto the part B" far enough so that the ends of the part B" will project far enough through said nuts to project through holes $d$ in the push-plate, and to receive the nuts C, as hereinbefore described, for securing the parts B' B" to each other. The nuts C may then be screwed down tightly against the push-plates, and, forcing the push-plates against the nuts E, thus secure them firmly between the nuts C and E. The confronting faces of the nuts C and E may be enlarged as necessary to form braces for the push-plates. The link B not only forms a secure attachment for the push-plates, but also forms an attachment which may be readily and quickly made and as quickly and easily unmade. The link B may also be detached, when in a belt drawn over pulleys for use, without slacking the belt to permit of turning any part of the link to one side for release, and may also be attached with same advantages.

It will be seen that the nuts E may be formed integral with the part of the link on which they rest, as shown at Fig. 5, or they may be riveted thereon or otherwise attached, if preferred.

What I claim as new is—

1. A detachable link formed of two parts, B' B", each part having its ends threaded, in combination with nuts C, which are carried on one of the parts, and may be screwed forward to embrace both parts and connect the link, and screwed backward to detach it, substantially as and for the purpose specified.

2. A detachable link formed of two parts, each part having its ends threaded and adapted to be connected by nuts, substantially as described, and for the purpose specified.

3. In combination with a link formed in two parts, B' B", and with a conveyer-plate, D, through which one of the links passes, nuts C and E, adapted to secure the parts of the link together and to hold the push-plate firmly in place on the link, substantially as and for the purpose specified.

4. In combination with a link formed in two parts, screw-threaded at their ends for attachment to each other by nuts C, shoulders or projections E, between which and the nuts C the push-plates may be securely fixed, substantially as and for the purpose specified.

5. In combination with a link formed in two parts, a push-plate provided with holes or slot, through which one part of the link may be passed preliminary to securing the other part of the link thereto, substantially as described, and for the purpose specified.

In testimony whereof I affix my signature in presence of two witnesses.

LEWIS R. FIX.

Witnesses:
FRANK F. THUL,
A. M. PARSONS.